US008543483B2

(12) United States Patent
Dietrich

(10) Patent No.: US 8,543,483 B2
(45) Date of Patent: Sep. 24, 2013

(54) AUCTIONS FOR MULTIPLE ITEMS WITH CONSTRAINTS SPECIFIED BY THE BIDDERS

(75) Inventor: Brenda Lynn Dietrich, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 2278 days.

(21) Appl. No.: 09/850,383

(22) Filed: May 7, 2001

(65) Prior Publication Data

US 2003/0018560 A1    Jan. 23, 2003

(51) Int. Cl.
    *G06Q 40/00*    (2012.01)
(52) U.S. Cl.
    USPC .......................................... 705/37; 705/36 R
(58) Field of Classification Search
    USPC ..................................................... 705/35–37
    See application file for complete search history.

(56) References Cited

U.S. PATENT DOCUMENTS

| | | | | |
|---|---|---|---|---|
| 5,905,975 | A * | 5/1999 | Ausubel ........................... | 705/37 |
| 6,629,082 | B1 * | 9/2003 | Hambrecht et al. ........ | 705/36 R |
| 6,718,312 | B1 * | 4/2004 | McAfee et al. ................ | 705/37 |
| 6,952,682 | B1 * | 10/2005 | Wellman ........................ | 705/37 |
| 2002/0016759 | A1 * | 2/2002 | Macready et al. .............. | 705/37 |

OTHER PUBLICATIONS

Barnhart, Cynthia et al. "Branch-and-Price: Column Generation for Solving Huge Integer Programs", School of Industrial and Systems Engineering, Georgia Institute of Technology, Feb. 1994.
de Vries, Sven, et al. "Combinatorial Auctions: A survey", Zentrum Mathematik, TU Munchen, Dec. 1, 2000.
Mitchell, John E. "Cutting Plane and column generation methods using interior point methods", Mathematical Sciences, Rensselaer Polytechnic Institute, Nov. 25, 1997.

* cited by examiner

Primary Examiner — Charles Kyle
Assistant Examiner — Siegfried E Chencinski
(74) Attorney, Agent, or Firm — Daniel P. Morris; McGinn IP Law Group, PLLC

(57) ABSTRACT

A method for considering constraints imposed by the bidders in auctions for multiple items. The invention discloses representative examples of such constraints. We demonstrate that a winner determination problem may be formulated as an integer program, and may be solved by commercially available software packages. This invention includes both a business process of auctioning multiple items with constraints specified by the bidder, and a computer implemented method for determining winners in such an auction.

14 Claims, 8 Drawing Sheets

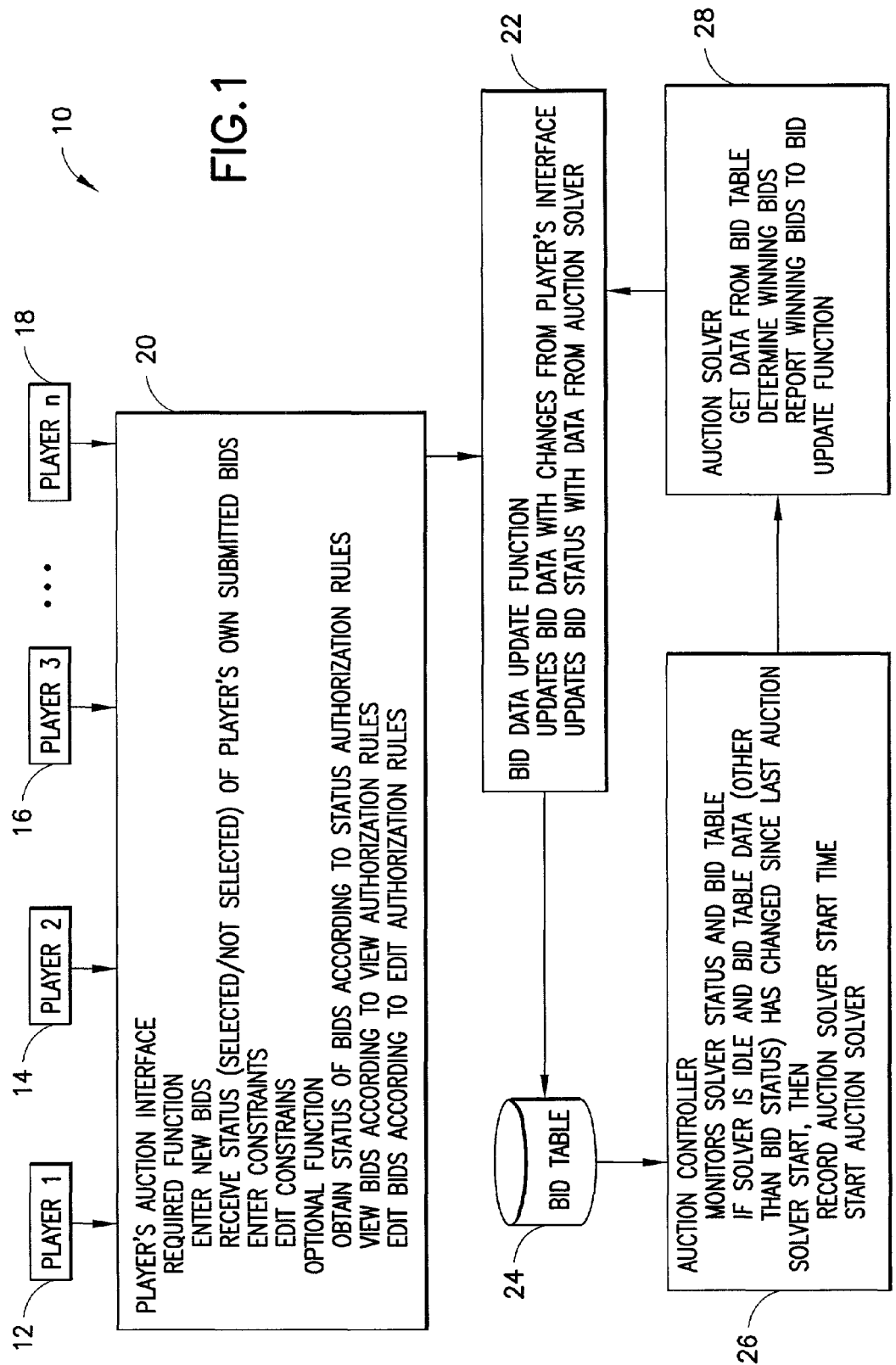

ADD CONSTRAINT
- BUDGET
- MIN/MAX QTY
- PRECEDENCE
- LINEAR

EDIT CONSTRAINT

ADD BID

| ITEM | BID VALUE | STATUS |
|---|---|---|
| 1 | 93 | SELECTED |
| 2 | 43 | UNSELECTED |
| 3 | 21 | SELECTED |
| 4 | 17 | UNSELECTED |
| 5 | 29 | UNSELECTED |

BASIC BID DATA

| SET | BUDGET |
|---|---|
| 1,2,3 | 120 |
| 3,4,5 | 50 |

BUDGET CONSTRAINTS

| ITEM | PRECEDENCE SET |
|---|---|
| 3 | 1 |
| 3 | 2, 4 |

PRECEDENCE CONSTRAINTS

| MIN QTY | SET | MAX QTY |
|---|---|---|
| 2 | 1,2,3,4 | |
|  | 2,4,5 | 2 |

QUANTITY CONSTRAINTS

| ITEM | COEF | COEF |
|---|---|---|
| 1 | 10 | 10 |
| 2 | 10 | −10 |
| 3 | 20 | 10 |
| 4 | 40 | −10 |
| 5 |  | 10 |
| TOTAL | 60 | 20 |

LINEAR CONSTRAINTS

FIG.2a

ADD CONSTRAINT
- BUDGET
- MIN/MAX QTY
- PRECEDENCE
- LINEAR

EDIT CONSTRAINT

ADD BID

| ITEM | BID VALUE | STATUS |
|---|---|---|
| 3 | 43 | UNSELECTED |
| 4 | 29 | SELECTED |
| 5 | 31 | SELECTED |
| 6 | 12 | SELECTED |
| 7 | 17 | UNSELECTED |

BASIC BID DATA

| SET | BUDGET |
|---|---|
| 5,6,7 | 50 |

BUDGET CONSTRAINTS

| ITEM | COEF | COEF |
|---|---|---|
| 3 | 20 | 15 |
| 4 | 30 | 18 |
| 5 | 21 | 13 |
| 6 |  | 17 |
| 7 | 30 | 14 |
| TOTAL | 50 | 48 |

LINEAR CONSTRAINTS

↖ 32

FIG.2b $$\text{MAX } 93x_{1,1} + 43x_{1,2} + 21x_{1,3} + 17x_{1,4} + 29x_{1,5} + 43x_{2,3} + 29x_{2,4} +$$
$$31x_{2,5} + 12x_{2,6} + 17x_{2,7}$$

SUBJECT TO
$$x_{3,1} + x_{3,2} \leq 1$$
$$x_{4,1} + x_{4,2} \leq 1$$
$$x_{5,1} + x_{5,2} \leq 1$$
$$93x_{1,1} + 43x_{1,2} + 21x_{1,3} \leq 120$$
$$21x_{1,3} + 17x_{1,4} + 29x_{1,5} \leq 50$$
$$x_{1,2} + x_{1,4} + x_{1,5} \leq 2$$
$$2z_{1,1}^{Min} \leq x_{1,1} + x_{1,2} + x_{1,3} + x_{1,4}$$
$$x_{1,1} \leq z_{1,1}^{Min}$$
$$x_{1,2} \leq z_{1,1}^{Min}$$
$$x_{1,3} \leq z_{1,1}^{Min}$$
$$x_{1,3} \leq z_{1,3,1}^{P} + z_{1,3,2}^{P}$$
$$z_{1,3,1}^{P} \leq x_{1,1}$$
$$2z_{1,3,2}^{P} \leq x_{1,2} + x_{1,4}$$
$$10x_{1,1} + 10x_{1,2} + 20x_{1,3} + 40x_{1,4} \leq 60$$
$$10x_{1,1} - 10x_{1,2} + 10x_{1,3} - 10x_{1,4} + 10x_{1,5} \leq 20$$
$$31x_{2,5} + 12x_{2,6} + 17x_{2,7} \leq 50$$
$$20x_{2,3} + 30x_{2,4} + 21x_{2,5} + 30x_{2,7} \leq 50$$
$$15x_{2,3} + 18x_{2,4} + 13x_{2,5} + 17x_{2,6} + 14_{2,5} \leq 48$$
$$x_{1,1}, x_{1,2}, x_{1,3}, x_{1,4}, x_{1,5} \in \{0,1\}$$
$$x_{2,3}, x_{2,4}, x_{2,5}, x_{2,6}, x_{2,7} \in \{0,1\}$$
$$z_{1,2}^{Min}, z_{1,3,1}^{P}, z_{1,3,2}^{P} \in \{0,1\}$$

FIG.3a (NUMERAL 34)

MAX $29y_{1,1} + 114y_{1,2} + 60y_{1,4} + 72y_{1,5} + 46y_{1,6} + 153y_{1,7} + 165y_{1,8} + 139y_{1,9} +$
$43y_{2,1} + 29y_{2,2} + 31y_{2,3} + 12y_{2,4} + 17y_{2,5} + 55y_{2,8} + 60y_{2,9} + 60y_{2,10} +$
$41y_{2,11} + 104y_{2,14} + 72y_{2,15}$

SUBJECT TO $y_{1,1} + y_{1,2} + y_{1,4} + y_{1,5} + y_{1,6} + y_{1,7} + y_{1,8} + y_{1,9} \leq 1$ $y_{2,1} + y_{2,2} + y_{2,3} + y_{2,4} + y_{2,5} + y_{2,8} + y_{2,9} + y_{2,10} + y_{2,11} + y_{2,14} + y_{2,15} \leq 1$ $y_{1,2} + y_{2,1} + y_{2,8} + y_{2,9} + y_{2,14} + y_{2,15} \leq 1h$ $y_{2,4} + y_{1,6} + y_{1,7} + y_{1,9} + y_{2,2} + y_{2,10} + y_{2,11} + y_{2,14} \leq 1$ $y_{1,1} + y_{1,5} + y_{1,6} + y_{1,8} + y_{1,9} + y_{2,3} + y_{2,10} + y_{2,14} \leq 1$ $y_{1,1}, y_{1,2}, y_{1,4}, y_{1,5}, y_{1,6}, y_{1,7}, y_{1,8}, y_{1,9}, y_{2,1} \in \{0,1\}$ $y_{2,2}, y_{2,3}, y_{2,4}, y_{2,5}, y_{2,8}, y_{2,9}, y_{2,10}, y_{2,11}, y_{2,14}, y_{2,15} \in \{0,1\}$

THE FIRST CONSTRAINT SELECTS AT MOST ONE PROPOSAL FROM PLAYER 1;

THE SECOND CONSTRAINT SELECTS AT MOST ONE PROPOSAL FROM PLAYER 2;

THE THIRD CONSTRAINT SELECTS AT MOST ONE PROPOSAL THAT INCLUDES ITEM 3;

THE FOURTH CONSTRAINT SELECTS AT MOST ONE PROPOSAL THAT INCLUDES ITEM 4;

THE FIFTH CONSTRAINT SELECTS AT MOST ONE PROPOSAL THAT INCLUDES ITEM 5;

CONSTRAINTS FOR ITEMS 1,2,6 AND 7 ARE NOT REQUIRED IN THIS EXAMPLE, BECAUSE ONLY ONE PLAYER BIDS ON EACH OF THESE ITEMS AND SO THE ITEM CONSTRAINT IS IMPLIED BY THE PLAYER CONSTRAINT

FIG.3b (NUMERAL 36)

PLAYER 1'S PROPOSALS

| PROPOSAL | ITEMS | VALUE | REJECT? |
|---|---|---|---|
| 1 | 5 | 29 | |
| 2 | 1,3 | 114 | |
| 3 | 1,5 | 122 | YES |
| 4 | 2,4 | 60 | |
| 5 | 2,5 | 72 | |
| 6 | 4,5 | 46 | |
| 7 | 1,2,4 | 153 | |
| 8 | 1,2,5 | 165 | |
| 9 | 1,4,5 | 139 | |
| 10 | 1,2,3,5 | 182 | YES |

PLAYER 2'S PROPOSALS

| PROPOSAL | ITEMS | VALUE | REJECT? |
|---|---|---|---|
| 1 | 3 | 43 | |
| 2 | 4 | 29 | |
| 3 | 5 | 31 | |
| 4 | 6 | 12 | |
| 5 | 7 | 17 | |
| 6 | 3,4 | 72 | YES |
| 7 | 3,5 | 74 | YES |
| 8 | 3,6 | 55 | |
| 9 | 3,7 | 60 | |
| 10 | 4,5 | 60 | |
| 11 | 4,6 | 41 | |
| 12 | 5,6 | 43 | YES |
| 13 | 6,7 | 29 | YES |
| 14 | 3,4,5 | 104 | |
| 15 | 3,6,7 | 72 | |

FIG.6

AUCTIONS FOR MULTIPLE ITEMS WITH CONSTRAINTS SPECIFIED BY THE BIDDERS

FIELD OF THE INVENTION

We disclose a method for considering constraints imposed by the participants in auctions for multiple items. We include representative examples of such constraints. We demonstrate that the winner determination problem may be formulated as an integer program, and may be solved by commercially available software packages. This invention includes both a business process of auctioning multiple items with constraints specified by the bidder, and a computer implemented method for determining winners in such an auction.

SUMMARY OF THE INVENTION

A Problem Solved by the Invention

Auctions have been used in the sale of items for many years. Auctions provide a means of making scare goods available to a large audience, and of ensuring that the seller receives the maximum revenue for the goods. Many forms of auctions exist, including open-cry auctions, silent auctions, ascending bid auctions, and descending bid auctions. With the advent of the Internet and other forms of electronic communications, auctions are becoming increasingly common.

Most auctions are for single items, or for multiple copies of the same item. Auctions for related items are often held simultaneously. E-bay.com and Amazon.com provide an auctioning capability through which individuals or companies can offer goods for auction. It is common for companies like eBay.com and Amazon.com to have many similar or related items on auction at the same time. Examples of similar items include multiple copies of the same book, toy, or CD being offered for sale in different, simultaneously active, auctions by different sellers. Examples of related items include separate, but simultaneous, auctions (often by different sellers) of a table and matching chairs.

There are numerous instances where the value (to a bidder) of a set of goods may not equal the sum of the value (to that bidder) of the individual goods. In some cases, the value of a collection of items, such as an airline ticket, a hotel room, and theater tickets, may be higher than the sum of the value of the individual items. In this case, the items (airline ticket, hotel, theater tickets) are said to complement one another. In other cases, the sum of the value of the individual items, such as theater tickets and concert tickets for the same time and date, may be higher than the value of the combination. In this case, the items are said to substitute for one another. Therefore, a bidder, attempting to obtain a collection of items, or to obtain one collection from a set of specified collections, through participation in several single item auctions, is faced with a dilemma. She may bid on all the items in her desired collection, and obtain some, but not all, of the items in that collection. Even if the total amount she bids does not exceed her value for the collection, she may end up paying more for the items she receives than she values that subset of the collection. Similarly, if she bids for both theater tickets and concert tickets, she may end up with both sets of tickets, at a cost greater than her value for the pair.

Finally, in small business/consumer to small business consumer auction such as eBay.com and Amazon.com. bidders often have a limited budget, or a limited spending target for certain classes of items. When a bidder over spends this budget, through unexpectedly winning more auctions than anticipated, he may not have sufficient funds to complete all the contracted transactions. This typically results in the bidder defaulting on some transactions. In some auctions, old "losing" bids get reinstated (potentially resulting in a cascade of defaults); in others; the item is simply re-listed for auction.

Seller side constraints may be appropriate in instances in which a seller wishes to sell multiple items, is indifferent as to whether items are sold to a single or multiple buyers, but wishes to sell all or most of the collection so as not to be left with only 1 n value items.

Therefore, it is evident that in auction systems offering multiple items, there is a need for methods through which participants can specify constraints that describe or characterize the combination of items they desire to win or sell, as well as a need for methods to solve the winner determination problem in auction systems that permit participants to specify such constraints.

Accordingly, in a first aspect of the present invention, we now disclose a method comprising the steps of:
(1) establishing an auction system; and
(2) enabling the auction system so that it is responsive to constraints specified by or on behalf of a participant in the auction.

In a second aspect of the present invention, we disclose a program medium executable in a computer system for facilitating an auction, the program medium comprising steps for:
(1) establishing an auction system; and
(2) enabling the auction system so that it is responsive to constraints specified by or on behalf of a participant in the auction.

BRIEF DESCRIPTION OF THE DRAWING

The invention is illustrated in the accompanying drawing, in which:

FIG. 1 shows a system block diagram of a total auction system;

FIGS. 2*a*, 2*b* show a depiction of a user interface;

FIGS. 3*a*, 3*b* provide an illustration of an integer programming formulation;

FIG. 6 shows an additional (optional) user interface that permits a bidder to review and modify proposals.

DETAILED DESCRIPTION OF THE INVENTION

Figure 4:
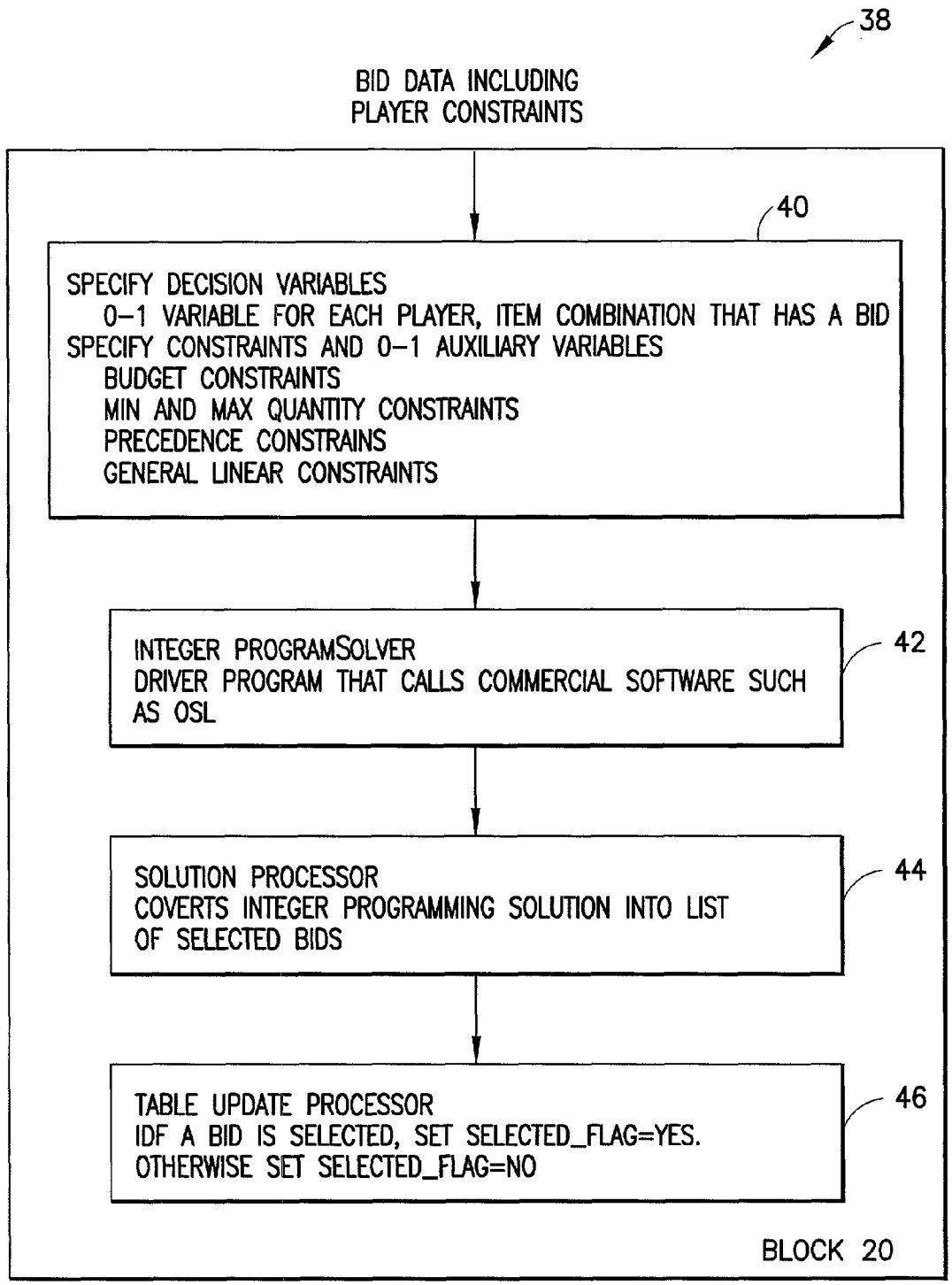
FIG. 4 shows the FIG. 1 system where the winners may be determined by solving an initial integer programming formulation.

We describe methods that allow a bidder in an auction system to specify constraints that describe or characterize the combinations of items he wishes to win. We demonstrate how these constraints can be used, together with item availability information and auction system objectives, to formulate an integer program that represents the winner determination problem.

We assume that multiple items are being offered for auction, and that the auction system itself provides a means for bidders to search through the items and to place bids on individual items. We also assume that the auction system provides a means for informing bidders of auctions they have won.

Each bidder can bid an arbitrary number of bids. Each bid is for a unique item and specifies the amount that the bidder is willing to pay for that item. Each bidder can also specify a set of constraints.

The simplest, but possibly most valuable constraint is a budget constraint that specifies the total amount the bidder is willing to pay for a collection of items on which he has placed bids. This constraint is relevant only if the total amount bid on the items in the collection is greater that the specified budget.

A maximum quantity constraint provides a generalization of the concept of substitutability. A bidder may place bids on $n \geq 2$ items, and express a willingness to win only $m < n$ of the items. We expect that this function would typically be used primarily for the case of similar items.

A minimum quantity constraint is used to represent factors such as economies of scale by the bidder. A bidder places bids on $n \geq 2$ items, and is willing to win any of these items if and only if he wins at least $m < n$ of them.

A precedence constraint is used to indicate that a bidder is willing to win one item only if he also wins another item. This can be generalized to a precedence set for an item: a bidder is willing to win an item, only if he also wins all of the $n \geq 1$ items in a precedent set specified for that item. We further generalize to alternate precedence sets in which a bidder is willing to win an item only if he wins all of the items in at least one of the $m \geq 1$ precedence sets specified for that item. A general linear constraint allows the bidder to reflect other considerations, such as total volume or weight, of items. The bidder specifies a coefficient (typically non-negative) $a_i$ for an item i and maximum and/or minimum quantities, denoted $C^U$ and $c^L$ respectively, that indicate upper and lower bounds on the sum of the coefficients that of combinations of items that the bidder is willing to accept. More than one constraint of this form is allowed.

All of these constraints can be represented by linear relationships between indicator variables on the bids, with the inclusion of some auxiliary indicator variables, as will be demonstrated below. Other, non-linear constraints may also be of interest and are included in this invention. However, we note that for simplicity of use, and for solvability of the winner determination problem, a restriction to linear constraints is generally a desirable feature for an auction system.

Sellers may also express constraints. Typical seller constraints would include minimum revenue for a set of items (analogous to a "reserve price—but in a set), minimum quantity to be sold in the case of a collection of similar or identical items, and precedence constraints, stating that one item should be sold only if another item is also sold.

For completeness, we describe a simple user interface that allows a bidder to represent the constraints mentioned above. In the case of internet auctions, the user interface may be implemented as web pages, or as a function running on the bidder's internet access device. This invention includes the use of other interfaces that provide equivalent capability. The bids placed by a bidder are presented to the bidder in a table with a line for each bid. The bid line includes information that identifies the item, the bid amount, and may optionally include information on the status of the bid and on bidder specified constraints involving the bid.

The user interface allows the user to indicate the type of constraint he wishes to enter. The options include: budget constraint, maximum quantity constraint, minimum quantity constraint, precedence constraint, and general linear constraint. This indication may be made by a variety of means, including selecting a URl or clicking on a location in the web page, selecting a radio button labeled with the constraint type, or entering a characters in an editable field and submitting a request to the auction. Once the type of constraint has been selected, the bidder provides additional information.

A budget constraint is specified by selecting a set of bids and indicating a budget value for that set. More than one constraint budget constraint can be specified in this fashion.

A maximum quantity constraint is specified by selecting the set of items to be included in the constraint and indicating a maximum quantity for that set.

A minimum quantity constraint is specified by selecting the set of items to be included in the constraint and indicating a minimum quantity for that set.

A simple precedence constraint is specified by first specifying the item that has precedence, and then specifying the elements of a precedence set. If there are alternate precedence sets, the bidder specifies each alternate set separately.

General linear constraints are specified by allowing the bidder to select a set of items, and then to specify a coefficient for each selected item and an upper and lower bound for each constraint.

Once all of the bidder constraints have been entered, an integer program for selecting the winning bids may be formulated. Let I denote the set of items, P denote the set of bidders, $B_p$ denote the set of bids placed by bidder p, and B denote the entire set of bids. For convenience, we use $B^1$ denote the set of bids for item i. For each $i \in I$ and each $p \in P$, let $v_{i,p} \geq 0$ denote the value of the bid bidder p has placed for item i. This value is 0 if there is no such bid. To designate whether the bid by bidder p for item i is included in the winning combination of bids, we use decision variables $x_{i,p}$ each of which must take either the value 0 (indicating that the bid i is not in the winning combination) or the value 1 (indicating that the bid i is in the winning combination). Note that we only include these variables for bidder-item combinations for which bids have been placed. Each of the user specified constraints described above can be modeled as a linear constraint in these binary variables.

Budget constraints are represented as follows: let $S_{l,p}^b$ be the set of items in the l-th budget constraint specified by bidder p and let $b_{l,p}$ be the budget specified for bidder p for this set of items. Then the budget constraint is given by $$\sum_{i \in S_{l,p}^b} v_{i,p} x_{i,p} \leq b_{l,p}$$

Maximum cardinality constraints are represented as follows: let $S_{l,p}^{Max}$ be the set of items in the l-th maximum cardinality constraint specified by bidder p and let $q_{l,p}^{Max}$ be the maximum quantity specified for bidder p for this set of items. Then the maximum quantity constraint is given by $$\sum_{i \in S_{l,p}^{Max}} x_{i,p} \leq q_{l,p}^{Max}$$

Minimum cardinality constraints are represented as follows: let $S_{l,p}^{Min}$ be the set of items in the l-th minimum cardinality constraint specified by bidder p and let $q_{l,p}^{Min}$ be the minimum quantity specified for bidder p for this set of items. We introduce an auxiliary variable, $z_{l,p}^{Min}$ which takes the value 1 if any of the items in $S_{l,p}^{Min}$ are selected, and 0 otherwise.

Then the minimum quantity constraint is represented by the following constraint.

$$z_{l,p}^{\text{Min}} \geq \sum_{i \in S_{l,p}^{\text{Min}}} x_{i,p} \geq q_{l,p}^{\text{Min}} z_{l,p}^{\text{Min}} \quad 5$$

Note that if $z_{l,p}^{Min}$ is 0, then all of the $x_{i,p}$ variables corresponding to bids by bidder p for items in $S_{l,p}^{Min}$ must also be 0. If any of these variables takes the value 1, then at least $q_{l,p}^{Min}$ of them must take the value 1.

Simple precedence constraints are represented as follows: Let $S_{p,1}^{PO}$ denote the (single) precedence set for item i by bidder p. Then the simple precedence constraint is given by $$|S_{p,i}^{PO}| x_{i,p} \leq \sum_{ji \in S_{p,i}^{PO}} x_{j,p}$$

Representing multiple precedence constraints requires the addition of auxiliary 0-1 variables, used to indicate which of the precedence sets are satisfied. Let $S_{p,1,l}^{P}$ denote the l-th precedence set for item i by bidder p. Let $z_{p,1,l}^{P}$ be a 0-1 variable which takes the value 1 if and only bidder i is awarded all of the items in $S_{p,1,l}^{P}$. Then the alternate precedence constraint is represented by the following constraints.

$$|S_{p,i,l}^{P}| z_{p,i,l}^{P} \leq \sum_{j \in S_{p,i,l}^{P}} x_{j,p} \quad \text{for all } l$$

$$x_{i,p} \leq \sum_{l} z_{p,i,l}^{P}$$

General linear constraints are easy to represent. Let $S_{p,l}^{G}$ be the set of bids in the l-th general linear constraint specified by bidder p. Let $c_{p,l}^{U}$ and $c_{p,l}^{L}$ denote the bidder specified upper bound and lower bound respectively. For each item $j \in S_{p,l}^{G}$ let $\alpha_{p,l,j}$ be the coefficient assigned by the bidder to item j. Then the general linear constraint is given by $$c_{p,l}^{L} \leq \sum_{j \in S_{p,l}^{G}} a_{p,l,j} x_{p,j} \leq c_{p,l}^{U}$$

The set of winning bids can be determined by solving the following integer program:

$$\text{Max} \sum_{i,p} v_{i,p} x_{i,p}$$

Subject to $$\sum_{p} x_{i,p} \leq 1 \quad \text{for all } i \in I \quad (1)$$

$$\sum_{i \in S_{l,p}^{b}} v_{i,p} x_{i,p} \leq b_{l,p} \quad \text{for all } p \in P, \text{ all } l \quad (2)$$

-continued $$\sum_{i \in S_{l,p}^{\text{Max}}} x_{i,p} \leq q_{l,p}^{\text{Max}} \quad \text{for all } p \in P, \text{ all } l \quad (3)$$

$$z_{l,p}^{\text{Min}} \geq \sum_{i \in S_{l,p}^{\text{Min}}} x_{i,p} \geq q_{l,p}^{\text{Min}} z_{l,p}^{\text{Min}} \quad \text{for all } p \in P, \text{ all } l \quad (4)$$

$$|S_{p,i}^{PO}| x_{i,p} \leq \sum_{ji \in S_{p,i}^{PO}} x_{j,p} \quad \text{for all } p \in P, \text{ all } l \quad (5)$$

$$|S_{p,i,l}^{P}| z_{p,i,l}^{P} \leq \sum_{j \in S_{p,i,l}^{P}} x_{j,p} \quad \text{for all } p \in P, \text{ all } l, \text{ all } i \quad (6)$$

$$x_{i,p} \leq \sum_{l} z_{p,i,l}^{P} \quad \text{for all } p \in P, \text{ all } l, \text{ all } i \quad (7)$$

$$c_{p,l}^{L} \leq \sum_{j \in S_{p,l}^{G}} a_{p,l,j} x_{p,j} \leq c_{p,l}^{U} \quad \text{for all } p \in P, \text{ all } l \quad (8)$$

$$x_{i,p} \in \{0, 1\} \quad \text{for all } i \in I, p \in P \quad (9)$$

$$z_{p,i,l}^{P} \in \{0, 1\} \quad \text{for all } \in I, p \in P, \text{ all } l \quad (10)$$

$$z_{p,l}^{\text{Min}} \in \{0, 1\} \quad \text{for all } \in I, p \in P, \text{ all } l \quad (11)$$

Constraint (1) says that each item is in at most one winning bid. If it is required that each item be in exactly one winning bid (that is, that all of the items be sold) then the inequality should be changed to an equality. In this case, a dummy bid should be added for each individual item should be added, so that a feasible solution is guaranteed to exist. The remaining constraints have already been explained.

Commercial integer programming solvers (such as the OSL product from IBM or the ILOG product from CPLEX) can be used to solve problems of this form. However, the computation time and the amount of computer memory required to solve large auctions may be excessive, especially when there are a large number of user specific constraints. An alternative formulation, based on column generation techniques, may be more computationally attractive. Note that the bidder specific bids apply only to a single bidder (that is, each involves only the variables for a single value of the subscript p) and that the variables for different bidders are linked only by the item availability constraints.

Rather than consider each bid individually, and use constraints to indicate which combinations of bids can be selected simultaneously, we consider, for each bidder, the combinations of that bidder's bids that can be simultaneously in a winning solution. We call such combinations proposals. Essentially, a proposal is a set of bids from a single bidder, that satisfy all of the constraints specified by that bidder. If a bidder has placed a small number of bids, proposals from that bidder can be determined by enumeration. Otherwise, attractive (in terms of revenue) proposals can be generated for each bidder by solving a relatively small integer program involving only bids for that bidder.

For a bidder p we let $\Phi_p$ denote the collection of proposals for bidder p. Note that each proposal is a set of bids (or, equivalently, a bidder and a set of items). For a proposal $C_{k,p}$ in $\Phi_p$, the amount that bidder p would pay for the proposal is denoted $w_{p,k}$ and is equal to the sum of the value of the bids in $C_{k,p}$, given by $$w_{k,p} = \sum_{i \in C_{k,p}} v_{i,p}.$$

Let $\Phi = \cup_p \Phi_p$ be the set of proposals. Then the winning combination of bids can be determined by selecting at most one proposal for each bidder, while ensuring that each item is in at most one selected proposal. For each $C_{k,p} \in \Phi_p$ we use 0-1 decision variables $y_{k,p}$ which indicates whether the proposal is selected ($y_{k,p}=1$) or not ($y_{k,p}=0$). We include constraints that allow only one proposal to be selected from each bidder; however, since all bidder specific constraints are satisfied by all of the proposals, we do not need to include constraints to enforce this restriction. The set of winning bids can be determined by solving the following integer program:

Subject to $$\text{Max} \sum_p \sum_{C_{k,p} \in \Phi_p} w_{k,p} y_{k,p}$$

$$\text{Subject to} \sum_{p,k: i \in C_{p,k}} y_{k,p} \leq 1 \quad \text{for all } i \in I$$

$$\sum_k y_{k,p} \leq 1 \quad \text{for all } p \in P$$

$$y_{k,p} \in \{0, 1\} \quad \text{for all } C_{k,p} \in \Phi$$

Although this formulation may potentially have far more decision variables than the original formulation, our computational experience indicates that for many integer programming problems, column generation based formulations may improve solvability. This faster computation time is due in part to the fact that all of the constraints in formulations like the one above have the same structure (sum of a set of variables is less than or equal to 1), and that the variables partition naturally in to sets of variables associated with each bidder. This partition, into so-called "special ordered sets" can be taken advantage of in commercial integer programming software.

It is important to note that the column generation approach works even when the columns of the matrix are not explicitly given, so long as the set of columns has a well defined structure (e.g., solutions to the set of constraints specified by the bidder) and new columns can be easily identified (e.g., by adjusting the objective function, and solving the small integer program representing a bidder's constraints). For details on the column generation technique, see Optimization Theory for Large Systems, Leon S. Lasdon, 1970, MacMillan Publishing, pp, 146-148. For our formulation, columns correspond to proposals, which have a well defined structure. Furthermore, the dual variables associated with the item constraints, which are typically computed in the process of solving the integer program or its linear programming relaxation can be easily used to adjunct the proposal values, and the dual variables associated with the bidder constraints can be used to determine a threshold on the adjusted value of a proposal. Proposals are added to the restricted problem only if their adjusted value exceeds the threshold for the corresponding bidder.

Finally, we note that although the description above has been limited to the case of bidder specified constraints, analogous techniques can be used to represent seller constraints. One skilled in the art of mathematical optimization will readily observe how the above formulations can be modified to reflect those constraints in the winner determination problem.

DETAILED DESCRIPTION OF A PREFERRED EMBODIMENT OF THE INVENTION

Referring to the drawing, and more particularly to FIG. 1, there is shown a schematic diagram (10-28) of a computer implemented system for a combinatorial auction. One or more bidders participate in the auction. Two or more items are being auctioned. Each bidder uses a computer interface to interact with the auction. Each bidder can enter bids, and each bidder is informed, through the interface of the status of his or her bids. The status of a bid is "SELECTED" if the bid is in the current set of winning bids. If no additional bids are entered, the "SELECTED" bids will become the "WINNING" bids. However, if additional bids are submitted, or if the value of an existing bid is increased, or if a bidder constraint is modified, a "SELECTED" bid may become "UNSELECTED." Each bidder is allowed to edit his or her own bids although the types of edits may be significantly restricted by the auction rules. In general, we expect that bidders will be allowed to increase the value of their bids. We also allow a bidder to specify and edit constraints on combinations of bids (or equivalently, combinations of items) that he is willing to be awarded. The specification and modification of constraints by bidders is a novel feature of this invention. In some auctions, bidders may also be allowed to withdraw bids, perhaps subject to some penalty. We note that sellers may be allowed similar capability to place constraints and modify the set of items to be sold. This invention is not concerned with the particular bidding rules of the auction, only with the methods and systems used to select the winning bids.

Depending on the policy of the auction, as embodied in the authorization rules, bidders may be allowed to view all bids, or to view all winning bids. Viewing all bids is analogous to an open cry auction. The method and system described in this invention are applicable independent of the form of the authorization rules.

Bid data is maintained in a bid table, which is updated by a bid update function. The update function updates the bid table with information received from the bidders as well as with information received for the auction solver.

The Auction controller determines when the auction solver needs to run by monitoring the data in the bid table, or by receiving messages from the bid update function. The Auction controller also determines whether the solver is idle. In this figure we show only a single solver. For large auctions, with a large number of bidders, or for auction for very high value items, it may be desirable to run multiple solvers. In the first case, the solver run time may be greater than the interval between bid activity, and running multiple solvers can give bidders faster feedback on the status of their bids. In the second case, multiple solvers can be used to increase the confidence that optimal solutions are being obtained, so that the sellers' revenue is truly maximized.

FIG. 2 illustrates an implementation of the user interface, and the details of a single bidder's bid table. The details of the bid table are illustrated by example, although our methods can be applied to other forms of bid data as long as the required elements (bid id, bidder id, item in the bid, value of the bid, and user specified constraints) are included. FIG. 2a (numeral 30) shows bids and constraints for one bidder; FIG. 2b (numeral 32) shows bids and constraints for a second bidder.

FIG. 3 illustrates, by example, the integer programming formulation for an auction involving 7 items and the two bidders in FIG. 2. FIG. 3a (numeral 34) shows the initial formulation; FIG. 3b (numeral 36) shows the column based formulation.

FIG. 4 (numerals 38-46) illustrates a implementations of the details of the auction solver based on the first integer programming formulation. The representation of a combinatorial auction as an integer program is known. However the inclusion of participant-specified constraints in auctions, whether combinatorial or non-combinatorial, and the formulation of the winner determination problem with participant-specific constraints as an integer programming problem is a novel aspect of this invention.

Figure 5:
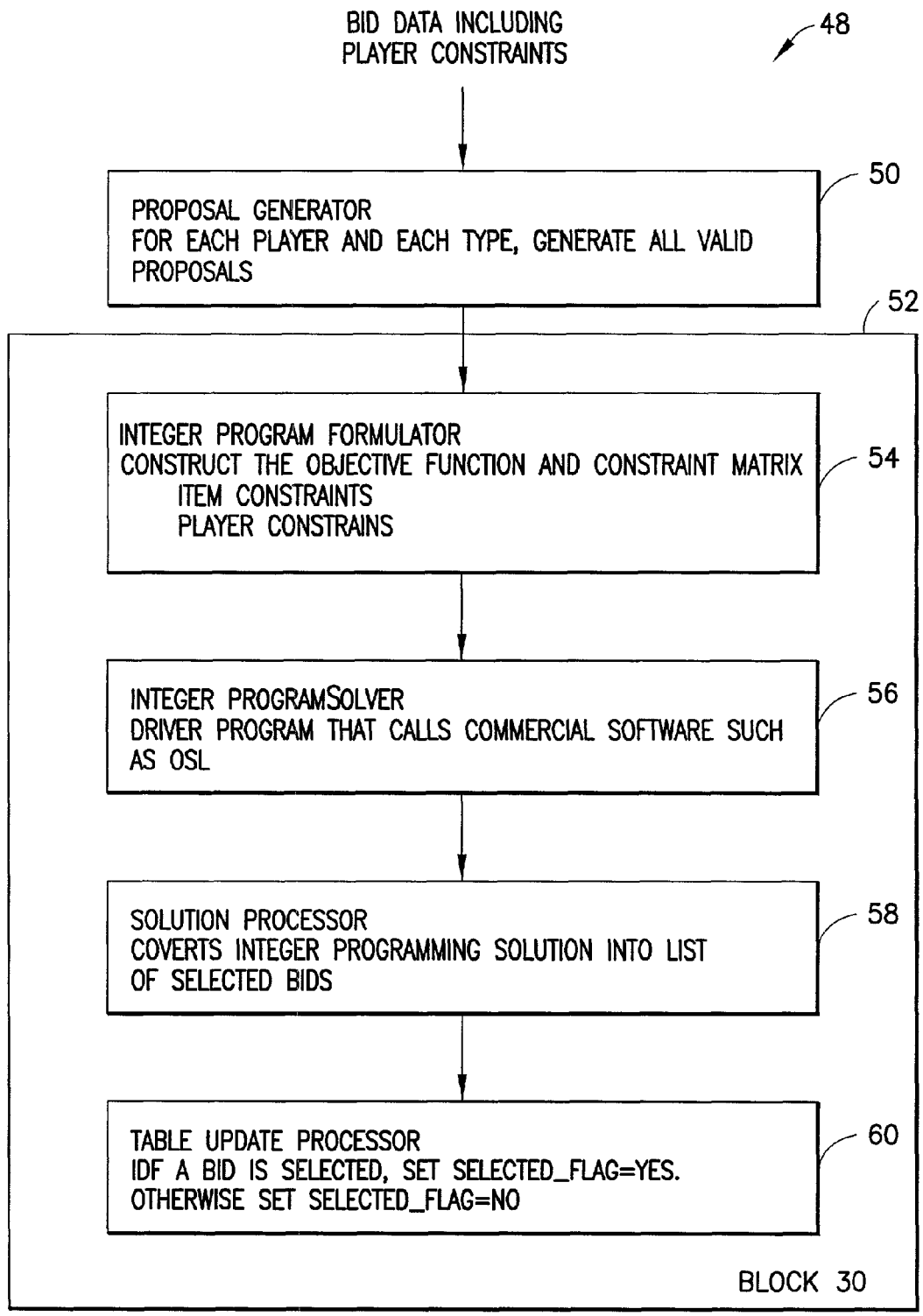
FIG. 5 shows the FIG. 1 system where the winners may be determined by solving a column generation based integer programming formulation.

FIG. 5 (numerals 48-60) illustrates an implementation of the details of the auction solver based on the second, column generation based integer programming formulation. The interpretation of bidder-specified constraints as a means of specifying combinatorial bids, and the use of a column generation formulation is also a novel aspect of this invention.

In the column-generation based solver the proposal generator generates valid proposals for each bidder and each type. The proposals are generated either by enumeration and evaluation, or by solving an integer program which involves only those variables and constraints related to a single bidder. This invention is not restricted to either of these methods for generating proposals.

As depicted in FIG. 6 (numeral 62), we also disclose the step of providing, to the bidder through a user interface, the ability to review and edit or reject the proposals that are generated based on the constraints specified by the bidder.

The integer program solver can make use of commercial software. In our implementation, we use functions included in the IBM product "Optimization Solutions and Library" (OSL), along with some problem specific code to steer the optimization process. Other commercial software for solving integer programs is available, and this invention is not limited to a particular choice of software or to a specific sequence of function calls used to invoke the selected software.

The solution to the first formulation is a set of selected bids. The solution to the second formulation is a set of selected proposals, which is readily translated into a set of winning bids. In both implementations, the list of winning bids is communicated to the bid data update function, which updates the bid status in the bid data table. If a bid is selected, its selected_flag is set to 1. Otherwise, its selected_flag is set to 0.

It is understood that the system and method of the present invention can be implemented using a plurality of separate dedicated or programmable integrated or other electronic circuits or devices (e.g., hardwired electronic or logic circuits such as discrete element circuits, or programmable logic devices such as PLDs, PLAs, PALs, or the like). A suitably programmed general purpose computer, e.g., a microprocessor, microcontroller or other processor device (CPU or MPU), either alone or in conjunction with one or more peripheral (e.g., integrated circuit) data and signal processing devices can be used to implement the invention. In general, any device or assembly of devices on which a finite state machine capable of implementing the flow charts shown in the figures can be used to enable the invention.

We claim:

1. A method for an auction comprising:
    establishing an auction system which is accessible via a network, and performs an auction for a plurality of items including a first item and a second item which is different than said first item;
    generating a web page including a user interface for entering a plurality of bids in said auction, said user interface displaying:
        an area for adding the plurality of bids;
        an area for adding a plurality of conditions associated with the plurality of items including a budget condition, a maximum quantity condition, a minimum quantity condition and a precedence condition and a linear condition;
        an area for editing said plurality of conditions;
        a bid table for displaying the plurality of bids; and
        a plurality of areas for displaying the plurality of conditions;
    receiving a plurality of bids which are added by a bidder using the user interface, the received plurality of bids including a bid for said first item and a bid for said second item, and receiving a plurality of conditions which are added by a bidder using said user interface, the received plurality of conditions including a condition associated with said first item, a condition associated with said second item, and a condition associated with a set of items including said first item and said second item;
    displaying the received plurality of bids in the bid table and displaying the received plurality of conditions in the plurality of areas for displaying the plurality of conditions on the user interface;
    generating by way of a programmed computer a plurality of proposals for said bidder, a proposal in said plurality of proposals comprising a set of bids in said received plurality of bids that satisfies said received plurality of conditions;
    formulating, by the programmed computer, a winner determination problem as an integer program, and solving said integer program to determine whether said generated plurality of proposals are included in a winning solution to said integer program, and displaying on an other user interface a table identifying the generated plurality of proposals and indicating whether said generated plurality of proposals are rejected by the bidder; and
    displaying a status of the received plurality of bids in the bid table based on a result of the solving of the integer program,
    wherein the received plurality of conditions comprises a first condition and a second condition which is different from the first condition, and the plurality of items comprises plural sets of items including a first set of items subject to the first condition and a second set of items which is different from the first set of items and is subject to the second condition, and
    wherein the plurality of conditions characterizes combinations of bids from the bidder for desired items within the auction system.

2. A method according to claim 1 wherein the auction system is selected from a group consisting of an open cry auction, an ascending bid auction, and a descending bid auction.

3. A method according to claim 1, wherein said plurality of conditions comprises a budget condition, and
    wherein said method further comprises:
        enabling the auction system such that it is responsive to said budget condition.

4. A method according to claim 3, wherein the budget condition is specified by the bidder.

5. A method according to claim 1, wherein said condition associated with said set of items is selected from the group consisting of a maximum quantity condition, a minimum quantity condition, a precedence condition, and a general linear condition.

6. A method according to claim 1, further comprising:
enabling the auction system so that it is responsive to seller conditions.

7. A method according to claim 6, wherein the seller conditions specify a minimum value for a combination of items.

8. A method according to claim 6, wherein the seller conditions specify a minimum value for a combination of a minimum number of items to be sold.

9. A method according to claim 6, wherein the seller conditions specify a minimum value for a combination of items correlated to a precedence relationship.

10. A method according to claim 1, wherein said network comprises the Internet, said user interface being displayed on said web page on the Internet.

11. A non-transitory computer readable medium executable in a computer system for facilitating an auction, the program medium comprising machine-readable instructions to cause the computer system to execute:
establishing an auction system which is accessible via a network, and performs an auction for a plurality of items including a first item and a second item which is different than said first item;
generating a web page including a user interface for entering a plurality of bids in said auction, said user interface displaying:
an area for adding the plurality of bids;
an area for adding a plurality of conditions associated with the plurality of items including a budget condition, a maximum quantity condition, a minimum quantity condition and a precedence condition and a linear condition;
an area for editing said plurality of conditions;
a bid table for displaying the plurality of bids; and
a plurality of areas for displaying the plurality of conditions;
receiving a plurality of bids which are added by a bidder using the user interface, the received plurality of bids including a bid for said first item and a bid for said second item, and receiving a plurality of conditions which are added by a bidder using said user interface, the received plurality of conditions including a condition associated with said first item, a condition associated with said second item, and a condition associated with a set of items including said first item and said second item;
displaying the received plurality of bids in the bid table and displaying the received plurality of conditions in the plurality of areas for displaying the plurality of conditions on the user interface;
generating a plurality of proposals for said bidder, a proposal in said plurality of proposals comprising a set of bids in said received plurality of bids that satisfies said received plurality of conditions;
formulating a winner determination problem as an integer program, and solving said integer program to determine whether said generated plurality of proposals are included in a winning solution to said integer program, and displaying on an other user interface a table identifying the generated plurality of proposals and indicating whether said generated plurality of proposals are rejected by the bidder; and
displaying a status of the received plurality of bids in the bid table based on a result of the solving of the integer program, wherein the received plurality of conditions comprises a first condition and a second condition which is different from the first condition, and the plurality of items comprises plural sets of items including a first set of items subject to the first condition and a second set of items which is different from the first set of items and is subject to the second condition, and
wherein the plurality of conditions characterizes combinations of bids from the bidder for desired items within the auction system.

12. A method according to claim 1, wherein said integer program is expressed by the following, subject to conditions specified by bidders in said auction:

$$\text{Max} \sum_{i,p} v_{i,p} x_{i,p}$$

where $v_{i,p}$ denotes a monetary value of a bid that bidder p has placed for item i, and, $x_{i,p}$ denotes a decision variable having a value of 0 when said bid is not in a winning combination, and 1 when said bid is in a winning combination.

13. A method of conducting an auction in an auction system in which plural items are offered for auction by a seller, and plural bidders place bids on said plural items, said method comprising:
establishing an auction system which is accessible via the Internet, and performs an auction for a plurality of items including a first item and a second item which is different than said first item;
generating a web page including a user interface for entering a plurality of bids in said auction, said user interface displaying:
an area for adding the plurality of bids;
an area for adding a plurality of conditions associated with the plurality of items including a budget condition, a precedence condition, an alternate precedence condition, a quantity condition and a general linear condition;
an area for editing said plurality of conditions;
a bid table for displaying the plurality of bids; and
a plurality of areas for displaying the plurality of conditions;
receiving a plurality of bids which are added by a bidder using the user interface, the received plurality of bids including a bid for said first item and a bid for said second item, and receiving a plurality of conditions which are added by a bidder using said user interface, the received plurality of conditions including a condition associated with said first item, a condition associated with said second item, and a condition associated with a set of items including said first item and said second item;
displaying the received plurality of bids in the bid table and displaying the received plurality of conditions in the plurality of areas for displaying the plurality of conditions on the user interface;
generating by way of a programmed computer a plurality of proposals for said bidder, a proposal in said plurality of proposals comprising a set of bids in said received plurality of bids that satisfies said received plurality of conditions;
after said bidder has input said plurality of bid, formulating, by the programmed computer, a winner determination problem including said plurality of conditions and a seller condition as an integer program, and solving said integer program to determine whether said generated plurality of proposals are included in a winning solution to said integer program, and displaying on an other user interface a table identifying the generated plurality of proposals and indicating whether said generated plurality of proposals are rejected by the bidder; and displaying a status of the received plurality of bids in the bid table based on a result of the solving of the integer program, wherein said integer program is expressed by the following:

$$\text{Max} \sum_{i,p} v_{i,p} x_{i,p}$$

where $v_{i,p}$ denotes a monetary value of a bid that bidder p has placed for item i, and, $x_{i,p}$ denotes a decision variable having a value of 0 when said bid is not in a winning combination, and 1 when said bid is in a winning combination, wherein said budget condition specifies a total amount that a bidder is willing to pay for an item, said precedence condition indicates that bidder will win an item of plural items only if bidder also wins another item of said plural items, said alternate precedence condition indicates that a bidder will win an item only if bidder wins all of the items in a precedence set, said quantity condition specifies one of a maximum quantity and a minimum quantity of items that said bidder will win, and said general linear condition indicates a coefficient for said plural items and an upper bound and lower bound on a sum of coefficients for said plural items, and wherein said seller condition comprises one of a condition indicating a minimum total amount that seller will accept for plural items, a condition indicating a minimum quantity of items in said plural items to be sold, and a precedence condition indicating that an item will be sold only if another item is sold, wherein the received plurality of conditions comprises a first condition and a second condition which is different from the first condition, and the plurality of items comprises plural sets of items including a first set of items subject to the first condition and a second set of items which is different from the first set of items and is subject to the second condition, and wherein the plurality of conditions characterizes combinations of bids from the bidder for desired items within the auction system.

14. The method of claim 1, wherein said plurality of areas for entering a plurality of conditions include:

an area for entering a budget condition that specifies that the bidder will win the item only if a total amount of winning bids for said set of items does not exceed a maximum value;

an area for entering a precedence condition that indicates that the bidder will win the item only if the bidder also wins the other item in the set of items;

an area for entering an alternate precedence condition which indicates that the bidder will win the item only if the bidder wins all of the items in the set of items;

an area for entering a maximum quantity condition which specifies that the bidder will win the item only if the bidder wins no more than a maximum quantity of items in the set of items;

an area for entering a minimum quantity condition which specifies that the bidder will win the item only if the bidder wins no less than a minimum quantity of items in the set of items; and an area for entering a general linear condition which indicates that the bidder will win the item only if a sum of coefficients assigned by the bidder for the set of items is not greater than an upper bound and not less than a lower bound.

* * * * *